Dec. 24, 1968  R. J. PURTELL  3,417,766
AUTOMATIC ALIGNMENT OF IRRIGATION SYSTEM
Filed Feb. 21, 1967  5 Sheets-Sheet 1
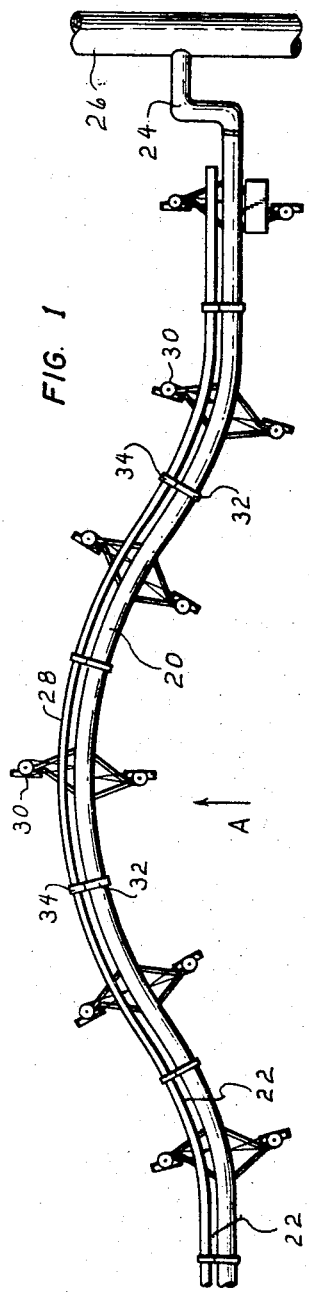
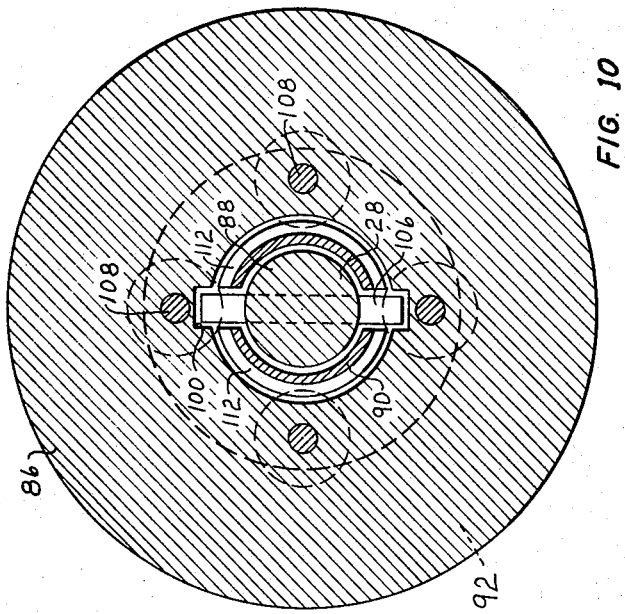
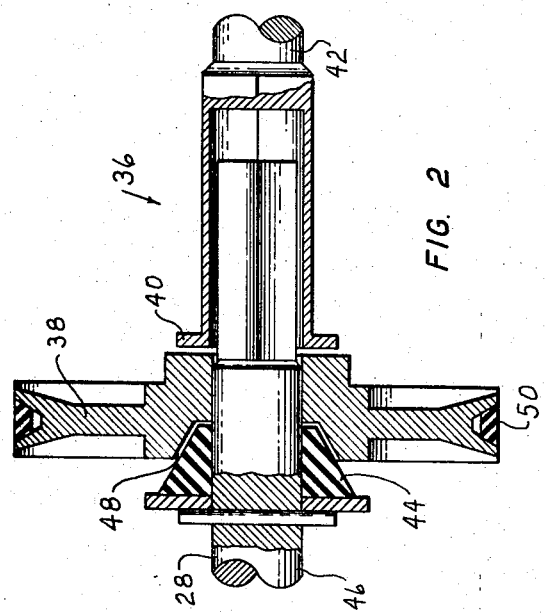
INVENTOR:
RUFUS J. PURTELL
BY:

Dec. 24, 1968   R. J. PURTELL   3,417,766
AUTOMATIC ALIGNMENT OF IRRIGATION SYSTEM
Filed Feb. 21, 1967   5 Sheets-Sheet 2

INVENTOR:
RUFUS J. PURTELL
BY:

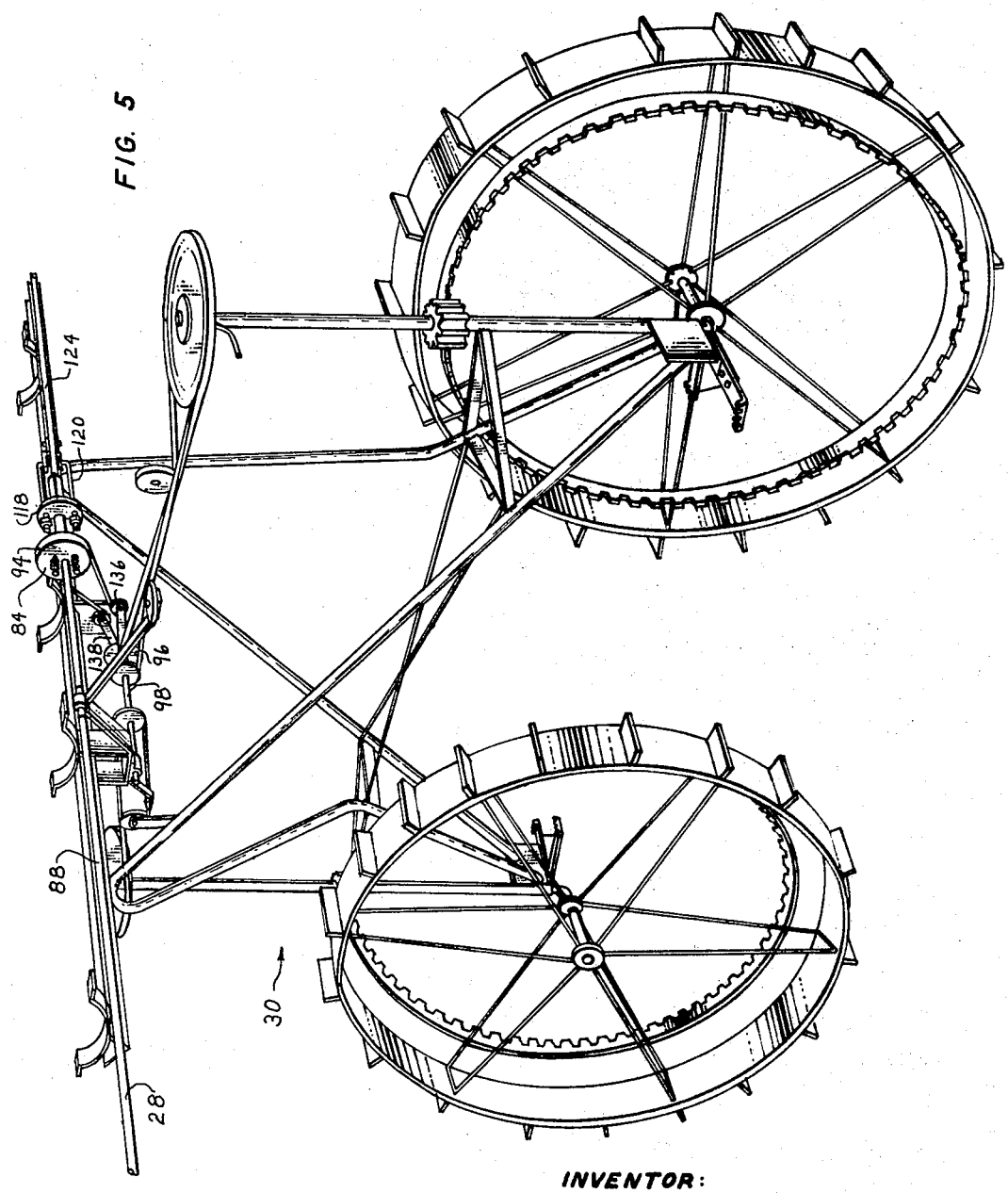

Dec. 24, 1968   R. J. PURTELL   3,417,766
AUTOMATIC ALIGNMENT OF IRRIGATION SYSTEM
Filed Feb. 21, 1967   5 Sheets-Sheet 4

INVENTOR:
RUFUS J. PURTELL

Dec. 24, 1968     R. J. PURTELL     3,417,766
AUTOMATIC ALIGNMENT OF IRRIGATION SYSTEM
Filed Feb. 21, 1967     5 Sheets-Sheet 5

INVENTOR:
RUFUS J. PURTELL

United States Patent Office 3,417,766
Patented Dec. 24, 1968

3,417,766
AUTOMATIC ALIGNMENT OF
IRRIGATION SYSTEM
Rufus J. Purtell, Brownfield, Tex., assignor, by mesne assignments, to Tri-Matic, Inc., Terry County, Tex., a corporation of Texas
Filed Feb. 21, 1967, Ser. No. 617,610
26 Claims. (Cl. 137—1)

ABSTRACT OF THE DISCLOSURE

The drive shaft of a laterally movable irrigation system is mounted horizontally displaced from the pipe. Therefore, misalignment will result in a change in length of the drive shaft, which change of length is used to realign the system, using a variable diameter sheave. A reversing mechanism is employed to permit the drive shaft to lead the pipe or follow the pipe as the system is reversed.

CROSS-REFERENCE TO RELATED APPLICATIONS

| Inventor | Serial No. | Filing date | Status |
|---|---|---|---|
| Purtell | 509,900 | Nov. 26, 1965 | Pat. No. 3,373,936. |
| Do | 526,867 | Feb. 11, 1966 | Pat. No. 3,381,894. |
| Hogg | 577,715 | Sept. 7, 1966 | Pat. No. 3,334,815. |

The above applications have disclosures resembling some of the disclosure of this application.

BACKGROUND OF THE INVENTION (1) *Field of the invention*

This invention relates to agricultural irrigation and, more particularly, to a vehicle system for moving agricultural irrigation sprinkler pipe.

(2) *Description of the prior art*

Shaft driven irrigation pipe movers have been known for over 50 years as shown in U.S. Patent No. 959,914, issued to Bevill, May 31, 1910. The problem of maintaining irrigation systems in alignment has been recognized and solutions sought as for example by Zybach, U.S. Patent No. 2,604,359, issued July 22, 1952. Also, previously, I have disclosed an aligning system utilizing variable diameter sheaves, U.S. Patent No. 3,245,595, issued Apr. 12, 1966.

SUMMARY

If two connected elements are bent in a curve with one element on the outside of the curve and the other element on the inside of the curve, either the outside element must stretch and grow longer or the inside element must contract and grow shorter. I have utilized this by placing the drive shaft to one side of the pipe on an irrigation system. The drive shaft has axially movable joints, e.g., slip joints. The irrigation pipe is much larger and, with the readily changeable length of the drive shaft, the irrigation pipe does not readily change length. Therefore, as vehicles become misaligned in the system, the pipe will curve and the drive shaft will either lengthen or shorten.

This change in the length of the drive shaft is used to bring the vehicles into line by changing the drive to the vehicles, as for example disengaging a clutch or changing the effective diameter of a variable diameter sheave.

The use of the drive shaft as the alignment means has several advantages, among them being that, since the system already has a drive shaft, a few extra elements are required. Also, the drive shaft must be made strong enough to power the vehicles and therefore the drive shaft is strong enough to exert considerable force to make the changes necessary to bring the system into alignment.

An object of this invention is to maintain the vehicles of a movable irrigation pipe system in alignment.

Further objects are to achieve the above with a device that is sturdy, compact, durable, simple, safe, versatile, and reliable, yet inexpensive and easy to manufacture, install, operate, and maintain.

Still further objects are to achieve the above with a method that is rapid and inexpensive and does not require skilled people to install, adjust, operate, and maintain.

The specific nature of the invention, as well as other objects, uses, and advantages thereof, will clearly appear from the following description and from the accompanying drawing, the different views of which are not necessarily to the same scale.

DESCRIPTION OF THE DRAWING

FIG. 1 is a schematic exaggerated plan view of a system according to this invention.

FIG. 2 is a sectional view of a first embodiment with a simple sheave unit to illustrate part of the principle of the invention.

FIG. 5 is a perspective view of a third embodiment with a complete vehicle but without the pipe.

FIG. 10 is a cross-sectional view taken on line 10—10 of FIG. 9 of the variable diameter sheave.

DESCRIPTION OF THE SPECIFIC EMBODIMENTS

Figure 4:
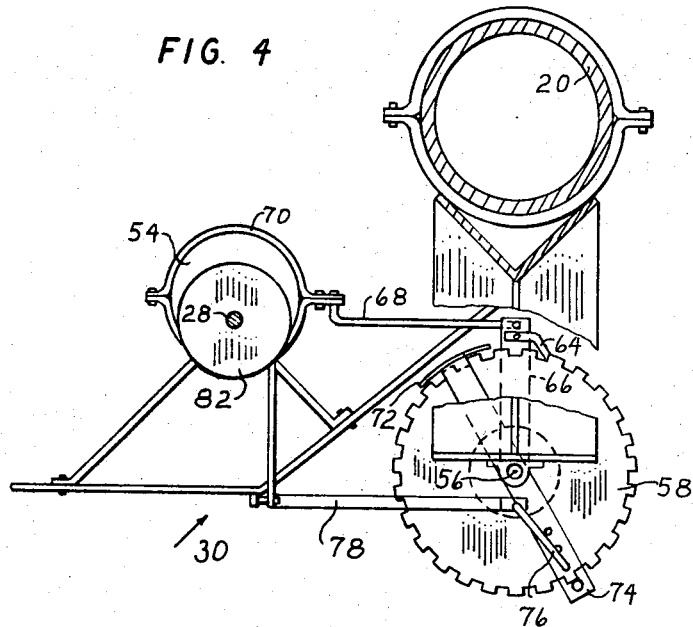
FIG. 4 is an end sectional view of the second embodiment taken on line 4—4 of FIG. 3.

Referring more particularly to FIG. 1, there is represented an irrigation pipe 20 with sprinklers 22 mounted thereon. There would be many more sprinklers but they have not been shown for clarity. The pipe 20 is connected by conduit 24 to main line 26. Therefore, the main line 26 acts as means for supplying water under pressure to the pipe 20. Those skilled in the irrigation arts will understand that a pump customarily supplies water under pressure to the main line 26.

Drive shaft 28 extends along the pipe 20 and to one side thereof. The drive shaft 28 is an elongated drive device or non-compressible element. It may be seen that, as some of the vehicles 30 get ahead of the remaining vehicles, the drive shaft lengthens in the position of FIG. 1 inasmuch as the system is moving in the direction of arrow A. Also, it will be noted that the vehicles and support brackets 32 change their angle slightly. (These features have been exaggerated in the drawing for the purpose of illustration.)

The drive shaft is supported by the pipe 20. The supports include brackets 32, carrying thrust bearing 34, approximately midway between vehicles 30. The thrust bearings prevent the drive shaft from moving axially with respect to the pipe from one vehicle to the next. Thus, it may be seen that, as a vehicle becomes misaligned, it will change the length of the shaft. Inasmuch as the shaft is anchored between vehicles, the shaft will move axially at the vehicles. Slip joints 36 at the vehicles permit this axial movement. (FIGS. 2, 3, 6, 8 and 9.) It is this changing or movement of the shaft at the vehicles which is utilized to detect or determine if the vehicle 30 is misaligned.

FIRST EMBODIMENT

A simple way to utilize the changing length of the drive shaft for alignment of a system is illustrated in FIG. 2. In this system, pulley 38 with a fixed diameter is journaled on the drive shaft 28 at a joint 36. Flange 40 is attached as by welding to section 42 of the drive shaft 28. Rubber cone 44 is attached to adjacent section 46 of the drive shaft. The pulley has a concavity 48 of correlative shape mating with the rubber cone 44. Belt 50 extends from the pulley 38 to a pulley on the vehicle and forms a portion of the gearing that forms means for driving the vehicle responsive of rotation of the shaft.

The elements of the system are proportioned so that with the vehicles 30 of the system in alignment, the cone 44 is jammed tightly within the concavity 48 and the pulley 38 rotates with the drive shaft 28. However, if the vehicle goes forward of the adjacent vehicles, the drive shaft 28 will lengthen inasmuch as the drive shaft in this embodiment is forward of the pipe. When the drive shaft lengthens, the rubber cone 44 will move away from the flange 40 inasmuch as the movement will occur in the slip joint 36. (This position illustrated.) With the rubber cone no longer being jammed into the concavity, the shaft will turn freely in the pulley and the vehicle will not move forward inasmuch as the gearing means for driving the vehicle has been totally inactivated.

As the vehicles to either side of the vehicle which is ahead advance, the previously misaligned vehicle will then be in alignment. The rubber cone 44 will again jam against the pulley 38, rotating the same, and the vehicle will move forward in alignment with the adjacent vehicles. The rubber cone 44 acts with the concavity 48 as a friction clutch. Obviously, projections and notches could be substituted, thus forming a dog clutch. Also, it will be noted that the distance between the cone 44 and the flange 40 is a measure of the movement of section 42 of the drive shaft 28 to section 44, and that this measurement spans the joint 36.

Analysis will show that, if the axis of the drive shaft is in the same horizontal plane as the axis of the pipe, the system will not be affected by hills and valleys traversed by the system. If the shaft is displaced to one side of the pipe, but not level with the pipe, the system will still maintain alignment on level ground. However, if a portion of the system moves over a hill or across a valley, the bending of the pipe will change the length of the drive shaft, causing the system to curve forward or rearward proportionately to the amount it curves upward and downward. I prefer to mount the drive shaft in the same horizontal plane as the axis of the pipe, but it will be understood that an operable system may be constructed with the drive shaft raised or lowered from that position.

Although the simple system described above is fully operable, it has certain disadvantages. These include the fact (1) that it can be moved in one direction only, i.e., with the drive shaft forward of the pipe, and (2) that it corrects misalignment in one mode only, that being stopping or slowing down a vehicle which is ahead of the others. Therefore, I prefer a more complex system described hereafter.

SECOND EMBODIMENT

Figure 3:
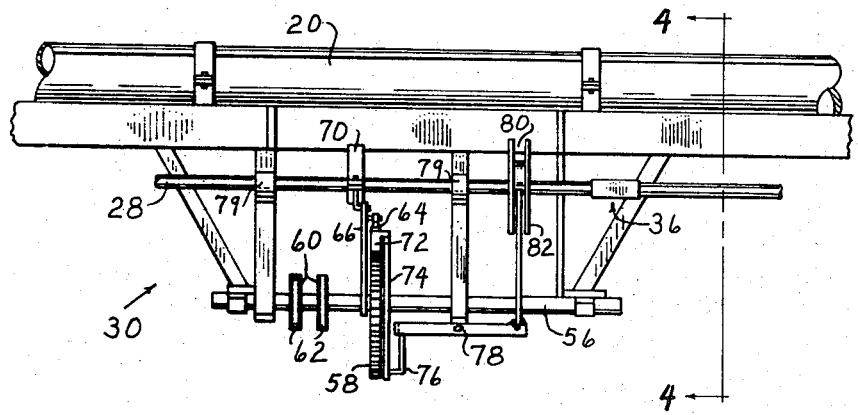
FIG. 3 is a front elevational view of a second embodiment of the invention.
Figure 7:
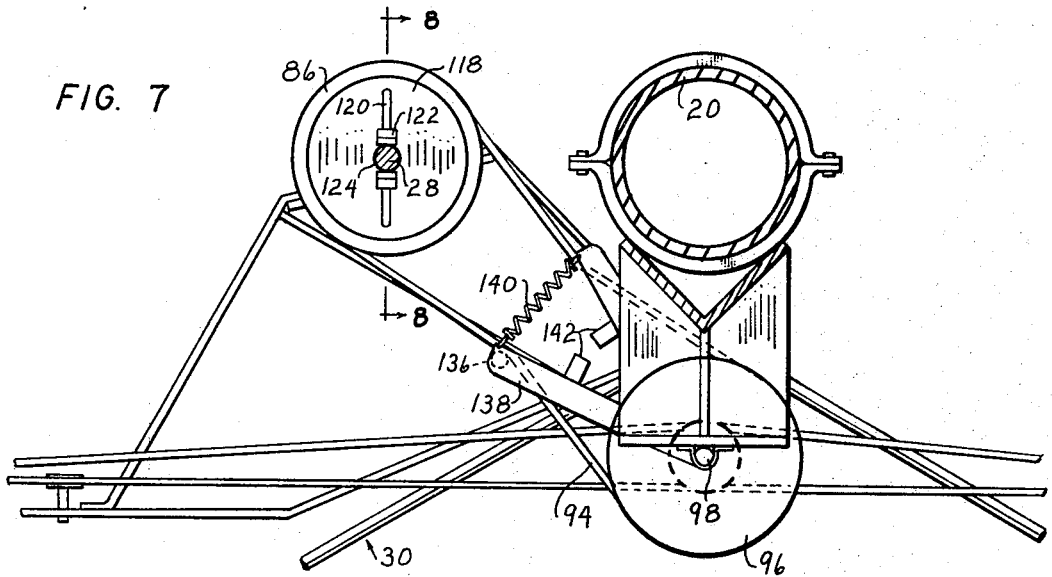
FIG. 7 is an end sectional view of the third embodiment taken on line 7—7 of FIG. 6.
Figure 6:
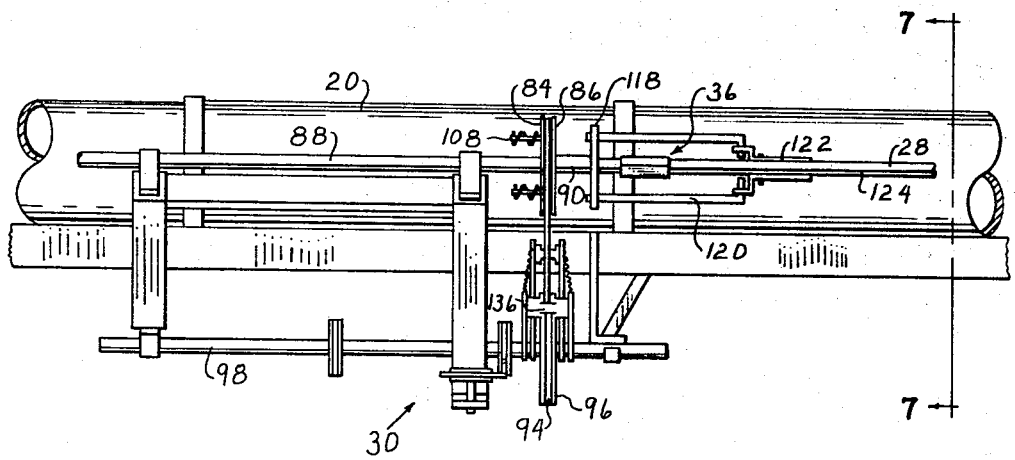
FIG. 6 is a front elevational view of the third embodiment.

FIGS. 3 and 4 illustrate a second embodiment. This embodiment bears a resemblance to my prior patent application, Ser. No. 509,900, noted above.

Eccentric 54 is mounted upon shaft 28. The jack shaft 56 is journaled to the vehicle and has ratchet 58 and two sheaves 60 mounted thereon. The sheaves carry belts 62 which extend to the wheels of the vehicle 30 to drive same. The ratchet is rotated by pawl 64 on arm 66 which is pivoted to jack shaft 56. The arm 66 is oscillated by pitman 68 which is attached to strap 70 encircling the eccentric 54. As described above, the rotation of the shaft 28 will drive the vehicle by advancing the pawl over about four teeth of the ratchet 58. Sector 72 is partially interposed between the pawl 64 and the ratchet 58 so that, in normal operation, the pawl rides on the sector 72 for half of its travel and ratchets over two teeth each cycle.

The sector 72 is attached to lever 74 which is pivoted about jack shaft 56. The movement of the lever 74 is controlled through pitman 76 by bell crank 78. The bell crank is pivoted to the frame of the vehicle at its center with pitman 76 attached to one end thereof and the other end of the bell crank rides in notch 80 of disk 82 connected to one of the sections of the drive shaft 28.

Analysis of the apparatus will show that, as the vehicle becomes misaligned, there will be a movement of the disk 82 relative to the vehicle 30 because of the lengthening or shortening of the shaft 28 described above.

This movement of the disk 82 is translated to movement of the sector 72 which causes the pawl 64 to advance the ratchet 58 either one tooth forward if the vehicle is slightly ahead or no teeth if the vehicle is more seriously ahead of the others. Also, if the vehicle is slightly behind, the sector is moved so that the pawl will advance the ratchet three teeth if the vehicle is slightly behind or four teeth if the vehicle is further behind.

If the vehicle is to be driven in the opposite direction, the pawl 64 is reversed to rotate the ratchet 58 in the opposite direction and the sector 72 is reversed so that the movement for lengthening or shortening the drive shaft 28 is reversed.

Analysis of this system will show that the means (including pawl 64 and ratchet 58) for driving the vehicle responsive to rotation of the drive shaft 28 is partially inactivated responsive to the determination of misalignment, the determination of misalignment being made by the movement of the drive shaft with respect to the vehicle. The bearings 79 attaching a section of the drive shaft 28 to the vehicle permit this axial movement of the shaft to the vehicle.

Also, it will be seen that, in FIGS. 3 and 4, the drive shaft is displaced to one side of the pipe 20 but it is also below the pipe. Inasmuch as the axes of the pipe 20 and drive shaft 28 are approximately 45° to the horizontal, this means that, if the system is run over a hill, there would be a horizontal curve in the pipe approximately equal to the vertical curve in the pipe.

THIRD EMBODIMENT

Referring now to FIGS. 5 through 10, a more sophisticated embodiment of the invention may be seen. As before, the drive shaft 28 is horizontally displaced to one side of the pipe 20. Here it is illustrated as being in the same horizontal plant as the axis of the pipe 20. Thrust bearings 34 are rigidly attached to the pipe 20 approximately halfway between vehicles. At this point, they prevent endwise or axial movement of the shaft 28 to the pipe 20. Half-sheave 84 is slidingly ttelescoped over section 88 of drive shaft 28. (FIGS. 8 and 9. Strut sleeve 90 is slidingly telescoped over section 88 outboard of half-sheave 84. Half-sheave 86 is slidingly telescoped over strut sleeve 90 so that the bevel faces 92 of the half-sheaves 84 and 86 are facing and form a sheave groove for belt 94. The belt 94 is trained around sheave 96 on jack shaft 98. The jack shaft is journaled to the frame of the vehicle 30. Additional belt gearing connects the jack shaft to the wheels of the vehicle for driving same. (FIG. 5).

It is noted that the vehicle with the jack shaft 98 and the subsequent belt gearing are commercially available on the market. The self-aligning feature, including the repositioning of the drive shaft 28 and the inclusion of the half-sheaves 84 and 86 with their associated equipment to be described hereafter, are well adapted to be installed on existing vehicles as a modification.

Figure 8:
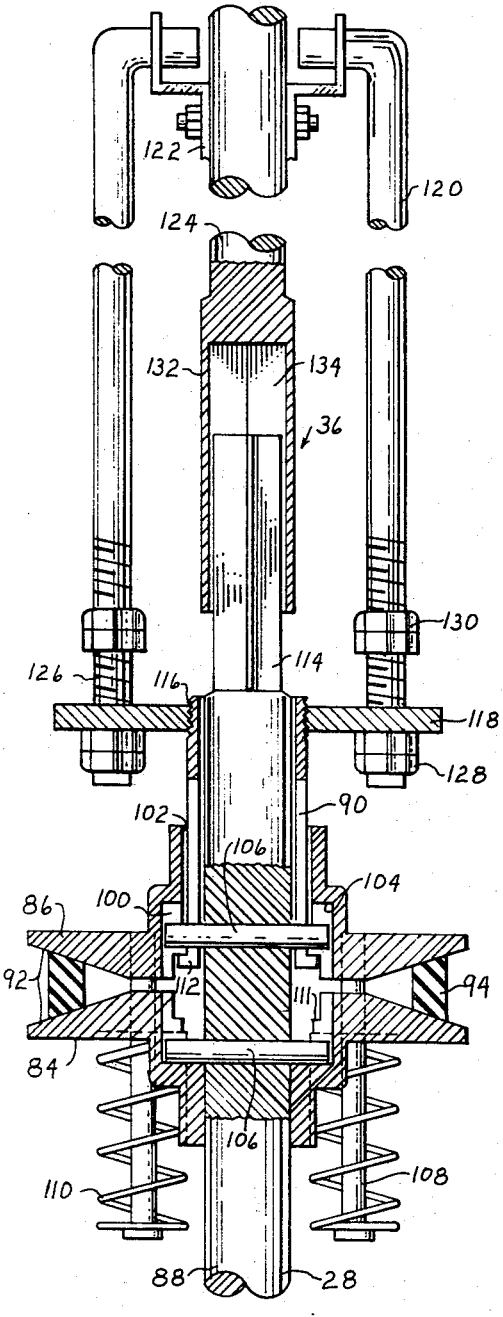
FIG. 8 is an axial sectional view of a variable diameter sheave of the third embodiment going in a "forward" direction, taken on line 8—8 of FIG. 7.
Figure 9:
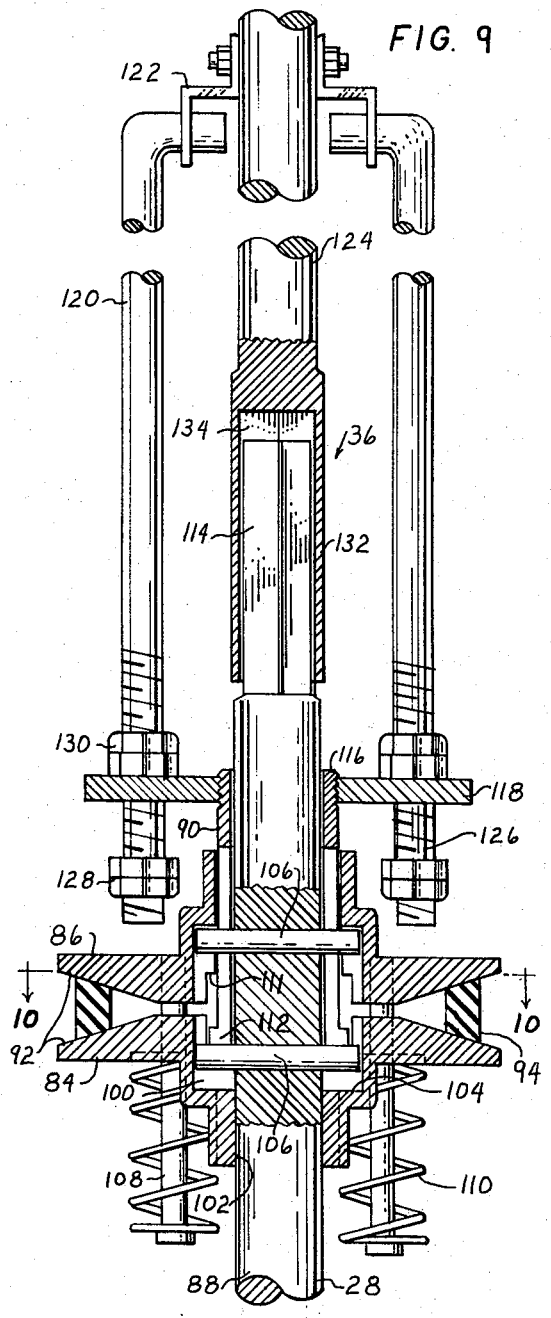
FIG. 9 is an axial sectional view similar to FIG. 8 going in a "reverse" direction.

Each half-sheave has diametrically opposed notches 100 extending partially within its internal bore 102 which terminate on the outer edge with shoulder 104. (FIGS. 8 and 9.) Projections from the shaft section 88 in the form of pins 106 extend into the notches 100. These pins perform a dual function of rotating the half-sheaves with the drive shaft section 88 and limiting the axial sliding movement of the half-sheaves to the section of drive shaft. Bolts 108 extend through the half-sheaves 84 and 86. Compression helical spring 110 on one end of the bolts biases the half-sheaves together.

Strut sleeve 90 is bifurcated on the portion telescoped within half-sheave 86 so that strut projections 112 are circumferentially displaced from pins 106. (FIGS. 8, 9, and 10.) Shoulders 111 within the bore 102 of the half-sheaves 84 and 86 are circumferentially displaced from the notches 100. They are constructed to be engaged by the strut projections 112. Thus, within limits, strut sleeve 90 is free to slide on both section 88 and within half-sheaves 84 and 86. The portion of strut sleeve 90 which extends out from half-sheave 86 is between half-sheave 86 and non-round male joint half 114. The portion of strut sleeve 90 so described is threaded at 116. Apertured plate 118 is threaded to the strut sleeve 90. Strut bars 120 extend through the apertures of plate 118 on one end. The other end of the strut bars 120 extend through apertures in reversing cranks 122. The reversing cranks are pivoted to section 124 of the drive shaft 28. As seen in FIGS. 8 and 9, the reversing cranks may be pivoted in one of two selected positions whereby the strut projections 112 bear against shoulder 111 of either half-sheave 84 or half-sheave 86. The end 126 of the strut bars 120 which extends through plate 118 is threaded and carries locked nuts 128 on one side of the plate 118 and locked nuts 130 on the other.

Female joint half 132 is attached to the end of section 124 and is of correlative non-round cross section as the male half 114 and is slidingly telescoped thereover. There is axial clearance 134 between the male and female half joints 114 and 132, which together form the joint 36.

FIG. 8 shows the operation in the direction of arrow A of FIG. 1, i.e., in a "forward" direction with the drive shaft 28 in front of pipe 20. The half-sheave 84 is in a position with shoulder 104 bearing against pin 106 and shoulder 111 of half-sheave 86 bearing against strut projection 112. Therefore, half-sheave 84 is connected to section 88 of the drive shaft and half-sheave 86 is connected to section 124 of the drive shaft. Thus, if the vehicle 30 to which the device is attached is forward of adjacent vehicles or if the pipe 20 has a "convex" curve, the sections 88 and 124 will move axially away from one another. Expressed otherwise, the drive shaft 28 will lengthen. This movement of the drive shaft is detected or determined or measured by the sliding movement of the strut sleeve 90 upon section 88. This sliding movement will pull the half-sheaves further apart, permitting the belt 94 to move inward so that the variable diameter sheave of half-sheaves 84 and 86 has a smaller effective diameter and the speed ratio of the gearing is reduced, thereby driving the vehicle slower. Inasmuch as the vehicle was ahead, the slower drive ratio will cause it to become realigned.

If in this position (FIG. 8) the vehicle is behind the adjacent vehicles and the pipe curves "concavely," the drive shaft 28 will shorten or the sections 88 and 124 will move closer together, causing the half-sheaves 84 and 86 to move closer together through the action of the springs 110. This movement closer together will increase the effective diameter of the sheave to increase the speed ratio of the gearing and speed up the vehicle to bring it forward and into alignment.

An alternate manner of analyzing the system is to say that the angle the brackets 32 make with each other is measured by the length or axial movement of the drive shaft. Yet another analysis is that deviation from a straight line is detected by measuring the curve of the pipe and the effect of the curve of the pipe upon the length or axial movement of the drive shaft 28. In this respect, measurement is made of the angle between different portions of the drive shaft 28. The axial movement of the drive shaft is measured in this embodiment from one section to another across the joint 36 having halves 114 and 132.

To reverse the direction of the movement of vehicles of the system, the drive shaft 28 is rotated in a reverse direction. Now the drive shaft 28 is behind or following the pipe 20. Each of the reversing cranks 122 is pivoted 180° so they are in the position as shown in FIG. 9. Thus the struts (including bars 120 and sleeve 90) are repositioned upon section 124. Now locked nuts 130 bear against plate 118 and strut projections 112 bear against shoulder 111 of half-sheave 84. Pin 106 bears against shoulder 104 of half-sheave 86. Thus, the connection of the half-sheaves 84 and 86 has been reversed as to sections 88 and 124. Now, half-sheave 84 is connected to section 124 and half-sheave 86 is connected to section 88. Therefore, analysis will show that, as the vehicle gets ahead, the shaft will shorten (the sections 88 and 124 move axially toward one another) and this movement will cause the half-sheaves 84 and 86 to move away from one another which will slow down the vehicle. Also, analysis will show that, if the vehicle gets behind, the shaft 28 will lengthen, resulting in a closing of the half-sheaves 84 and 86 to speed up the vehicle.

Initially the vehicles may be aligned by adjusting the locked nuts 128 when it is moving in the "forward" direction and the vehicles may be aligned by locked nuts 130 when the vehicles are moving in the "reverse" direction.

Scissor idlers 136 are mounted upon pivot arms 138 which are pivoted to the frame of the vehicle. Spring 140 biases the idlers toward one another to maintain the proper tension upon belt 94 regardless of the effective diameter of the variable diameter sheaves of half-sheaves 84 and 86. However, the amount the idlers 136 can move toward one another is limited by stops 142 upon the pivot arms 138. Therefore, if a vehicle gets so far ahead that the half-sheaves 84 and 86 are apart to their maximum positions, the stops 142 prevent movement of the idlers 136. Therefore, the idlers do not press against the belt 94, the belt is slack, and the means for driving the vehicle is totally inactivated.

Certain brackets, frame members, bearings, and other elements are necessary for the proper operation of the system, but they have not been described in detail inasmuch as they are well within the scope of those skilled in the art. An example of such elements are bearing hangers to properly space the section 88 from the jack shaft 98 at the vehicle. Those skilled in the art will understand that all bearings except thrust bearings 34 in bracket 32 permit the shaft 28 to move axially. Also, the motor mounted on the end vehicle is a means for rotating the shaft 28 and driving the system.

It will be apparent that the embodiments shown are only exemplary and that various modifications can be made in operation, construction, materials, and arrangement within the scope of the invention as defined in the appended claims.

I claim as my invention:

1. In an agricultural irrigation system having
   (a) an elongated pipe adapted to carry sprinklers thereon,
   (b) means attached to the pipe for supplying water under pressure to the pipe,
   (c) a plurality of vehicles movingly supporting the pipe,
   (d) an elongated drive device extending along the pipe,
   (e) means attached to the drive device for moving same,
   (f) means on each vehicle attached to the drive device for driving the vehicle responsive to movement of the drive device, (g) the improved method of detecting if one vehicle is misaligned with the remaining vehicles comprising:

(h) using the drive device to measure the curve of the pipe, inasmuch as the pipe will be curved if a vehicle is out of line.

2. In an agricultural irrigation system having
(a) an elongated pipe adapted to carry sprinklers thereon,
(b) means attached to the pipe for supplying water under pressure to the pipe,
(c) a plurality of vehicles movingly supporting the pipe,
(d) a drive shaft extending along the pipe,
(e) means attached to the drive shaft for rotating same,
(f) means on each vehicle attached to the drive shaft for driving the vehicle responsive to rotation of the drive shaft;
(g) the improved method of detecting if one vehicle is misaligned with the adjacent vehicles comprising:
(h) using the drive shaft to measure the angle portions of the drive shaft makes with respect to other portion, inasmuch as if a vehicle is out of line the drive shaft will not remain straight.

3. In an agricultural irrigation system having:
(a) an elongated pipe adapted to carry sprinklers thereon,
(b) means attached to the pipe for supplying water under pressure to the pipe,
(c) a plurality of vehicles movingly supporting the pipe,
(d) a drive shaft extending along the pipe,
(e) means attached to the drive shaft for rotating same,
(f) means on each vehicle attached to the drive shaft for driving the vehicle responsive to rotation of the drive shaft;
(g) the improved method of maintaining the vehicles in alignment comprising:
(h) changing the length of the drive shaft if a vehicle gets out of line, and
(j) realigning the vehicle which is out of line responsive to the changed length of the drive shaft.

4. The invention as defined in claim 3 with the additional limitation of
(k) said realigning being accomplished by changing the means for driving the vehicle.

5. The invention as defined in claim 4 with the additional limitation of
(m) changing said means for driving by changing the speed ratio within the gearng of the means for driving.

6. The invention as defined in claim 5 with the additional limitation of
(n) changng the speed ratio by changing the distance between the halves of a variable diameter sheave.

7. The invention as defined in claim 4 with the additional limitation of
(m) changing said means for driving the vehicle by at least partially inactivating said means for driving.

8. The invention as defined in claim 7 with the additional limitation of
(n) changing said means for driving the vehicle by totally inactivating said means for driving.

9. In an agricultural irrigation system having
(a) an elongated pipe adapted to carry sprinklers thereon,
(b) means attached to the pipe for supplying water under pressure to the pipe,
(c) a plurality of vehicles movingly supporting the pipe,
(d) means on each vehicle for driving said vehicle;
(e) the improved method of detecting if one vehicle is misaligned with the adjacent vehicles comprising:
(f) mounting a non-compressible elongated element to one side of the pipe,
(g) limiting the axial movement of the element from one vehicle to the next, and
(h) determining the axial movement of the element to the vehicle, which movement will be related to misalignment.

10. The invention as defined in claim 9 with the additional limitation of
(j) changing said means for driving the vehicle responsive to the detected misalignment.

11. In an agricultural irrigation system having
(a) an elongated pipe adapted to carry sprinklers thereon,
(b) means attached to the pipe for supplying water under pressure to the pipe,
(c) a plurality of vehicles movingly supporting the pipe,
(d) a sectioned drive shaft extending along the pipe, the sections connected by joints,
(e) means attached to the drive shaft for rotating same,
(f) means on each vehicle attached to the drive shaft for driving the vehicle responsive to rotation of the drive shaft;
(g) the improved method of detecting if one vehicle is misaligned with the remaining vehicles comprising:
(h) mounting the drive shaft displaced horizontally from the pipe,
(j) limiting the axial movement of the drive shaft from one vehicle to the next,
(k) permitting axial movement of the drive shaft at joints of the drive shaft, and
(m) determining the axial movement of the drive shaft at the vehicle, which movement will be related to misalignment.

12. The invention as defined in claim 11 with the additional limitation of
(n) said determining of axial movement being the determining of the axial movement of one section of drive shaft to another section of drive shaft across the joint.

13. The invention as defined in claim 11 with the additional limitation of
(n) said determining of axial movement being the determining of the axial movement of drive shaft relative to the pipe.

14. In an agricultural irrigation system having
(a) an elongated pipe adapted to carry sprinklers thereon,
(b) means attached to the pipe for supplying water under pressure to the pipe,
(c) a plurality of vehicles movingly supporting the pipe,
(d) a sectioned drive shaft extending along the pipe, the sections connected by joints,
(e) means attached to the drive shaft for rotating same,
(f) means on each vehicle attached to the drive shaft for driving the vehicle responsive to rotation of the drive shaft;
(g) the improved method of maintaining the vehicles in alignment comprising:
(h) mounting the drive shaft displaced horizontally from the pipe,
(j) limiting the axial movement of the drive shaft to the pipe from one vehicle to the next,
(k) permitting axial movement of the drive shaft at joints of the drive shaft, and
(m) changing said means for driving the vehicle responsive to the permitted movement of the drive shaft to correct misalignment.

15. The invention as defined in claim 14 with the additional limitation of
(n) changing said means for driving by changing the speed ratio within the gearing of the means for driving.

16. The invention as defined in claim 15 with the additional limitation of (o) changing the speed ratio by changing the distance between the halves of a variable diameter sheave.

17. The invention as defined in claim 14 with the additional limitation of (n) changing said means for driving the vehicle by at least partially inactivating said means for driving.

18. The invention as defined in claim 17 with the additional limitation of (o) changing said means for driving the vehicle by totally inactivating said means for driving.

19. In an agricultural irrigation system having (a) an elongated pipe adapted to carry sprinklers thereon,
(b) means attached to the pipe for supplying water under pressure to the pipe,
(c) a plurality of vehicles movingly supporting the pipe,
(d) a sectioned drive shaft extending along the pipe, the sections connected by joints,
(e) means attached to the drive shaft for rotating same, and
(f) means on each vehicle attached to the drive shaft for driving the vehicle responsive to rotation of the drive shaft;
(g) the improved structure for detecting misalignment of the vehicles in combination with the above comprising:
(h) each section of the drive shaft journaled in a thrust bearing,
(j) said thrust bearing rigidly connected to the pipe,
(k) the drive shaft horizontally displaced from the pipe,
(m) axial clearance within the joints to permit the sections to move axially with respect to each other, and
(n) measuring means at each vehicle for detecting axial movement of the drive shaft, thereby detecting misalignment of the vehicle.

20. The invention as defined in claim 19 with the additional limitation of (o) said means for detecting axial movement including structure interconnecting the pipe and the drive shaft.

21. The invention as defined in claim 19 with the additional limitation of (o) said means for detecting axial movement including structure interconnecting sections of the drive shaft spanning the joints.

22. The invention as defined in claim 21 with the additional limitation of (p) said structure spanning the drive shaft joint including a variable diameter sheave having two half-sheaves, which sheave forms a portion of said means for driving the vehicle.

23. The invention as defined in claim 22 with the additional limitations of:

(q) a second sheave mounted upon the vehicle,
(r) a belt interconnecting the variable diameter sheave to the second sheave,
(s) at least one idler biased against the belt, and
(t) means to limit the movement of the idler so that, when the halves of the variable diameter sheave are spaced away from each other the maximum amount, the idler does not bear against the belt, thus permitting the belt to be slack, thereby inactivating the means for driving.

24. The invention as defined in claim 22 with the additional limitations of:

(q) one half of the variable diameter sheave connected to one section of the drive shaft, and
(r) the other half of the variable diameter sheave connected to another section of the drive shaft.

25. The invention as defined in claim 24 with the additional limitation of (s) means interconnecting the shaft and sheave for reversing the connections of the halves to the sections.

26. In an agricultural irrigation system having (a) an elongated pipe adapted to carry sprinklers thereon,
(b) means attached to the pipe for supplying water under pressure to the pipe,
(c) a plurality of vehicles movingly supporting the pipe,
(d) a sectioned drive shaft extending along the pipe, the sections connected by joints,
(e) means attached to the drive shaft for rotating same, and
(f) means on each vehicle attached to the drive shaft for driving the vehicle responsive to rotation of the drive shaft;
(g) the improved structure for maintaining the vehicles in alignment comprising in combination with the above:
(h) each section of the drive shaft journaled in a thrust bearing,
(j) said thrust bearing rigidly connected to the pipe,
(k) the drive shaft horizontally displaced from the pipe,
(m) axial clearance within the joints to permit the sections to move axially with respect to each other,
(n) a first half-sheave telescoped over a first section of the drive shaft,
(o) a second half-sheave telescoped over said first section of the drive shaft,
(p) slots in each half-sheave,
(q) a projection extending from the shaft into the slots so as to rotate the half-sheaves with the shaft and limit their travel toward one another,
(r) a strut extending along the shaft to between the half-sheaves,
(s) a projection on the strut between the half-sheaves adapted to contact the half-sheaves selectively,
(t) the strut attached to a second section of the drive shaft, spanning the joint,
(u) spring means interconnecting the half-sheaves for biasing them toward one another,
(v) means for axially spacing the strut in one of two selected positions on the second section of the drive shaft so the projection on the strut displaces selectively the first half-sheave away from the second or displaces the second half-sheave away from the first, and
(w) a belt trained between the two half-sheaves,
(x) said belt forming a portion of said means for driving the vehicle.

References Cited

UNITED STATES PATENTS

| | | | |
|---|---|---|---|
| 2,800,364 | 7/1957 | Dick et al. | 239—212 XR |
| 3,147,764 | 9/1964 | Jensen | 239—212 XR |
| 3,217,737 | 11/1965 | Jensen | 137—344 |
| 3,245,595 | 4/1966 | Purtell | 137—344 XR |
| 3,268,174 | 8/1966 | Boone | 137—344 XR |
| 3,281,080 | 10/1966 | Hogg | 239—212 |

SAMUEL SCOTT, *Primary Examiner.*

U.S. Cl. X.R.

137—344; 239—212